INVENTOR:
RALPH F. HALE

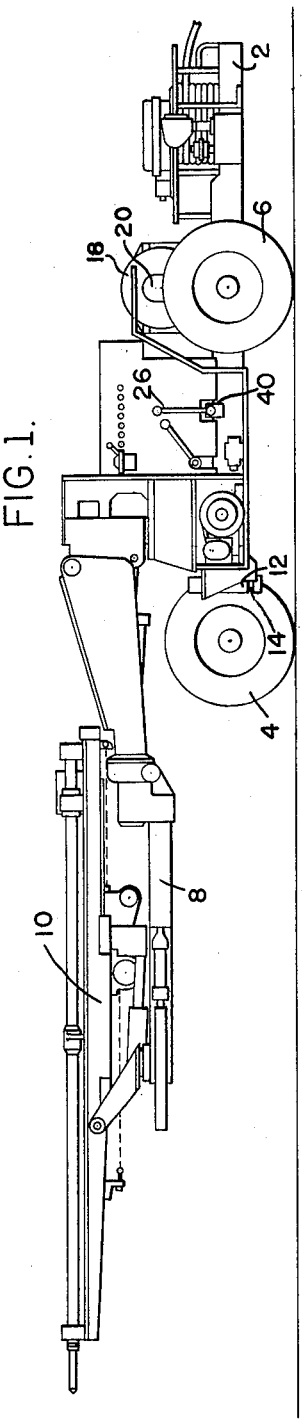

United States Patent Office 3,061,380
Patented Oct. 30, 1962

3,061,380
HYDRAULIC CONTROL CIRCUIT FOR A
MOVABLE VEHICLE
Ralph F. Hale, Claremont, N.H., assignor to Joy Manufacturing Company, Pittsburgh, Pa., a corporation of Pennsylvania
Filed Oct. 30, 1958, Ser. No. 770,827
11 Claims. (Cl. 303—6)

This invention relates to a hydraulic control circuit for a movable vehicle and more particularly to a hydraulic control circuit for energizing the brakes of a movable rotary drill.

At the present time it is common practice to mount hydraulic rotary drills on wheeled vehicles to permit them to be used at any desired location. With such vehicles it has also been known to provide hydraulic operating jacks for lifting the wheels closest to the working surface above the ground to obtain greater vehicle stability during the drilling operation. In addition it is desirable to lock the wheels remote or back from the working surface to additionally stabilize the vehicle. In the past, however, a separate hydraulic braking circuit has been provided for the back wheels which requires a control device, such as a master cylinder and means for maintaining a constant pressure thereon at all times during the drilling operation to obtain the desired stability. As can be appreciated such constant maintaining of the pressure in the braking circuit represents an additional cost of operating and an additional control which is subject to failure.

Accordingly one object of this invention is to provide a new and improved hydraulic control circuit for the wheels of a mobile support which has ground engaging jacks.

Another object of this invention is to provide a new and improved hydraulic control circuit for a hydraulic drill having a frame one end of which is mounted on ground engaging wheels which are nonrotatably held in a locked position by the jacks.

A more specific object of this invention is to provide a new and improved hydraulic control circuit for a movable vehicle having a frame one end of which is elevated above the ground by means of supplying high pressure fluid to an expandable chamber in a jack and the other end of which is mounted on ground engaging wheels having a brake mechanism connected to the chamber so that the wheels are nonrotatably locked when a high pressure exists in the chamber.

These and other objects of this invention will become more apparent upon consideration of the following detailed description of a preferred embodiment thereof, when taken in conjunction with the following drawings, in which:

FIG. 1 is a side elevational view of a hydraulic drill which employs a control circuit of this invention.

FIG. 2 is a schematic diagram of a hydraulic control circuit employed to nonrotatably hold the rear wheels of the drill shown in FIG. 1.

Figure 3:
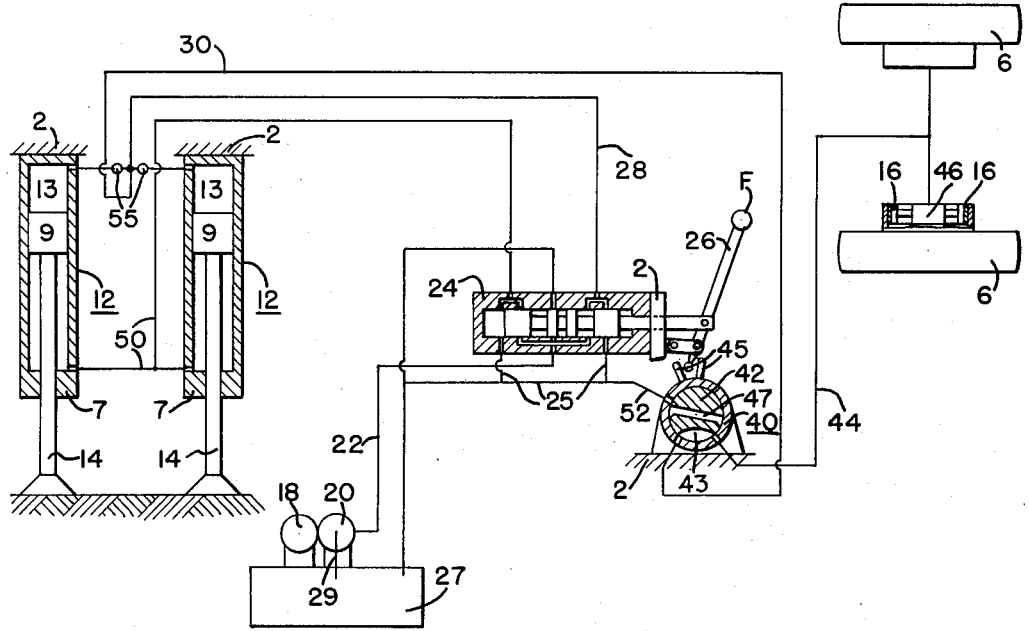
FIG. 3 is a schematic diagram of a hydraulic control circuit employed to non-rotatably hold the rear wheels of the drill shown in FIGURE 1 with the hydraulic cylinders extended.

As shown in FIG. 1 a hydraulic drill which employs the control circuit of this invention comprises a suitable vehicle frame 2 having a pair of axially supported rotatable front wheels 4 and a pair of axially supported rotatable rear wheels 6. As is customary in vehicles of this type a suitable boom 8 is supported on the frame 2 between the wheel pairs 4 and 6 and which is generally displaced from the center of the vehicle towards the front wheels 4. The boom 8 extends outwardly of the front wheels 8 to suitably support a suitable drill 10 to permit the drill to be moved to various operating positions as is more fully shown, described and claimed in my copending application, entitled Rotary Coal Drill, Serial No. 341,684, filed March 11, 1953, which application has been assigned to the same assignee as the assignee of this invention.

In order to obtain rigidity of the vehicle during the drilling operation a pair of hydraulic jacks 12 are secured to the frame 2 adjacent the wheels 4, respectively. Each of the jacks 12 FIG. 2) comprises an elongated vertically extending hollow cylinder 7 which is rigidly secured to the frame 2 in any suitable manner and in which a piston 9 is suitably reciprocably received. The piston 9 of each jack 12 forms an expandable chamber 13 with the housing 7 as is well known in the art. Each piston 9 has an elongated leg 14 rigidly secured thereto which extends outwardly from the lower end of the cylinder 7 so as to be movable into and out of engagement with the surface of the ground adjacent the wheels 4. During movement of the vehicle from one working location to another the legs 14 are located above the ground so as not to interfere with the vehicle movement. Once a working location has been secured the legs 14 of the jacks 12 are extended until they engage the ground and thereafter are further extended to elevate the frame 2 so that the front wheels 4 are located above the ground.

As shown a suitable electrical motor 18 is supported on the frame 2 for driving a suitable hydraulic pump 20 as is well known in the art. The high pressure discharge side of the pump 20 is connected by means of a suitable hydraulic line 22 to one portion of a suitable sectional hydraulic control valve 24 as is well known in the art which is suitably mounted on the frame 2. Another portion of the control valve 24 is connected by means of a suitable hydraulic line 25 to a hydraulic tank 27 which in turn is connected by a suitable hydraulic line 29 to the pump 20 to provide a closed hydraulic circuit.

The valve 24 is provided with a manually movable (FIG. 2) control handle 26 which normally occupies a neutral position N between forward F and rear R operating positions so that the discharge line 22 is connected to the hydraulic line 25. The handle 26 is movable to the forward operating (FIG. 3) position F so that the valve 24 disconnects the high pressure discharge line 22 from the line 25 and connects the line 22 to a suitable hydraulic line 28 which extends from the valve 24 to each of the operating chambers 13 of the jacks 12. The line 28 is also connected by means of a suitable hydraulic line 30 to a suitable auxiliary control valve, such as a rotary valve 40, which is suitably mounted on the frame 2 below the valve 24. As shown, the valve 40 is provided with a rotor 42 so that the line 30 is normally not connected to any other line controlled thereby when the handle 26 is in its neutral position N. The rotor 42 of the valve 40 is provided with a pair of upwardly extending spaced elements 45 located on opposite sides of the lower end of the handle 26 when the handle 26 is in its neutral position N and which are engageable, respectively, by the lower end of the handle 26 upon movement in opposite directions to rotate the rotor 42 of the valve 40 in opposite directions. When the handle 26 is moved to its forward operating (FIG. 3) position F the lower end thereof engages one of the elements 45 so that the rotor 42 is rotated with a passageway 43 therein connecting the line 30 to a suitable hydraulic line 44 connected to the valve 40. The line 44 thereafter divides into two integral portions one of which is connected to a hydraulic cylinder 46 in one rear wheel 6 and the other of which is connected to a hydraulic cylinder 46 in the other rear wheel 6. The cylinders 46 are of any well known construction having a piston which is outwardly movable under high pressure to force brake shoes 16 secured thereto into engagement with brake drums in the wheels 6. Inasmuch as such brake shoes and drums and the actuation thereof are well known in the art further description and illustration thereof are not believed to be necessary. It will also be noted that the lower portion of each cylinder 7 is connected by means of a suitable hydraulic line 50 to the control valve 24 and the valve 40 is connected to the line 25 by means of a suitable hydraulic line 52.

As indicated movement of the handle 26 to its forward operating position F connects the high pressure line 22 to the line 28 through the valve 24. In addition such forward movement F of the handle 26 connects the line 50 to the line 25 through the valve 24 so that a high pressure occurs in the chambers 13 and the legs 14 of the jack 12 are extended downwardly from the frame 2 into engagement with the surface of the ground. Further increase of pressure in the chamber 13 causes further outward movement of the legs 14 so that the front wheels 4 are elevated off the ground. Since the cylinders 46 are operable to apply the brakes in the rear wheels 6 in response to pressure in the chambers 13 the brakes of the rear wheels 6 are applied throughout the period the legs 14 of the jacks 12 are extended. After the legs 14 have been extended to their desired position the handle 26 is returned to its neutral position N whereat the line 22 is disconnected from the line 28 and is connected to the line 25 through the valve 24. In returning to its neutral position N the handle 26 does not affect any operation of the valve 40 so that the reaction pressure in the chambers 13 due to the weight of the vehicle forcing the cylinders 7 downwardly with respect to the legs 14 maintains the pressure in the line 30, passageway 43 and the line 44 so that the rear wheel brakes remain applied.

Figure 4:
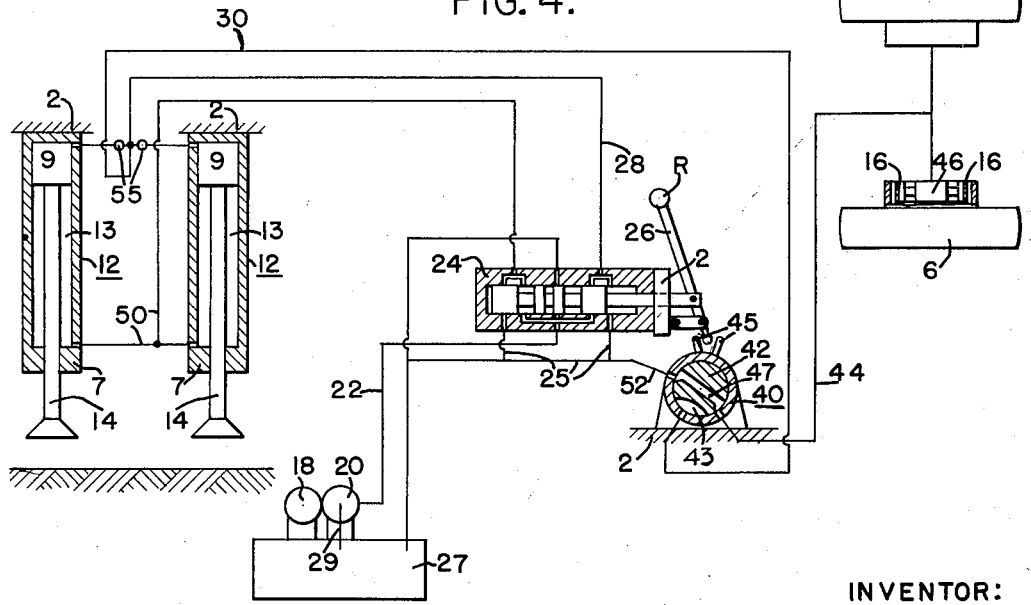
FIG. 4 is a schematic diagram of a hydraulic control circuit employed to release the rear wheels of the drill shown in FIGURE 1 with the hydraulic cylinders retracted.

When it is desired to move the vehicle the handle 26 is moved to its rear operating (FIG. 4) position R which through the structure of the valve 24 connects the line 22 to the line 50 and simultaneously connects the line 28 to the line 25 so that the high pressure discharge of the pump 20 is exerted against the lower surface of the pistons 9 to cause the legs 14 to be freely retracted. At the same time the lower end of the handle 26 engages the other element 45 to rotate the rotor 42 in the reverse direction as heretofore described so that the line 44 is connected to the tank 27 through passageway 47 and lines 52 and 25. Consequently the pressure in the cylinders 46 collapses so that the rear wheels 6 may easily be rotated. Thereafter the handle 26 is returned to its neutral position N to reestablish the heretofore described neutral N connections through the valve 24. Such return of the handle 26 does not cause the rotor 42 to rotate and the line 44 remains at tank pressure to insure that the wheels 6 are free until movement of the handle 26 to its forward position F.

Thus it will be noted that this invention provides an inexpensive and simple method for locking the brake wheels of a drill vehicle against rotation during the period the drill is being used. Although a rotary valve having engageable elements has been described it is to be realized that any suitable valve structure may be employed which is corelated to the movement of the control handle or separate manually operated valves may be employed. If desired suitable valves 55 may be provided in the line 28 adjacent each cylinder 7, respectively, to permit leveling of the frame 2 with reference to the ground.

Having described a preferred embodiment of this invention in accordance with the Patent Statutes, it is to be realized that modifications thereof may be made without departing from the broad spirit and scope of the invention. Accordingly, it is respectfully requested that this invention be interpreted as broadly as possible and be limited only by the prior art.

What I claim is:

1. A fluid control circuit for a movable vehicle comprising, a pair of rotatable wheels having a fluid operated braking mechanism, a fluid operated jack having a hollow housing, said jack having a movable member with one portion extending outwardly from said housing and another portion forming a variable size chamber within said housing, a first fluid transmitting line connected between said chamber and a control valve means which valve means is adapted to connect said first fluid line to a source of high pressure fluid whereby said outwardly extending portion of said movable member is forced outwardly of said housing as the pressure in said chamber increases, a second fluid line being connected to said control valve means and said braking mechanism, and said valve means being operable to disconnect said first fluid transmitting line from said source of high pressure fluid while maintaining said braking mechanism and said chamber connected through said second fluid line.

2. A fluid control circuit for a movable vehicle comprising, a frame having at least one rotatable supporting wheel with a fluid operated braking mechanism adjacent one end thereof, a fluid operated jack adjacent the other end of said frame having a tubular member and a plunger member which members are movable relative to each other to form a variable size chamber, said tubular member being rigidly secured to said frame and the other of said members being extendible therefrom, a selectively operable control valve means a first fluid transmitting line connected between said chamber and said control valve means, said valve means being adapted to connect said first fluid line to a source of high pressure fluid when said control valve is disposed in one position whereby said other member is forced outwardly of said tubular member as the pressure in said chamber increases, a second fluid line being connected between said control valve and said braking mechanism to cause operation thereof as fluid pressure in said chamber increases, and said valve means being operable to disconnect said first line from said source of high pressure fluid and to connect said chamber with said braking mechanism.

3. A fluid control circuit for a movable vehicle comprising, a frame having at least one rotatable supporting wheel with a fluid operated braking mechanism, a fluid operated jack having a hollow member and a plunger member which members are movable relative to each other to form a variable size chamber, one of said members being rigidly secured to said frame with the other of said members extendible therefrom, one fluid transmitting line connected between said chamber and one control valve, said valve having means to connect said one fluid line to a source of high pressure fluid and force said other member outwardly of said one member as the pressure fluid is admitted to said chamber increases, another fluid transmitting line connected between said braking mechanism and said one fluid transmitting line, another valve in said other line having movable means for controlling fluid flow therethrough from said one fluid line, said means of said one valve having means for causing movement of said movable means of said other valve to connect said fluid transmitting lines when said one fluid line is connected to such a source, and said means of said one valve being operable to disconnect said one fluid line from such a source without causing the fluid pressure in said chamber to decrease and without causing movement of said movable means of said other valve.

4. A fluid control circuit for a movable vehicle comprising, a frame having at least one rotatable supporting wheel with a fluid operated braking mechanism, a fluid operated jack having a hollow housing secured to said frame, said jack having a movable member with one portion extending outwardly from said housing and another portion forming a variable size chamber within said housing, one fluid transmitting line connected between said chamber and one control valve, said one valve having means movable from a first position to a second position to connect said one fluid line to a source of high pressure fluid and force said movable member outwardly of said housing as the pressure in said chamber increases, another fluid transmitting line connected between said braking mechanism and said one fluid line, another valve in said other fluid line having movable means for controlling fluid flow therethrough from said one fluid line, said movable means of said one valve having means for engaging said movable means of said other valve when moved from said first to said second position to connect said fluid transmitting lines, and said movable means of said one valve being movable back to said first position from said second position to disconnect said one fluid line from such a source without causing the fluid pressure in said chamber to decrease and without causing movement of said movable means of said other valve.

5. A fluid control circuit for a movable vehicle comprising, a frame having at least one rotatable supporting wheel with a fluid operated braking mechanism, a fluid operated jack having a hollow member and a plunger member which members are movable relative to each other to form a variable size chamber, one of said members being rigidly secured to said frame to permit the other of said members to extend therefrom, one fluid transmitting line connected between said chamber and one control valve, said one valve having means to connect said one fluid line to a source of high pressure fluid and force said other member outwardly of said one member as the pressure in said chamber increases, another fluid transmitting line connected between said braking mechanism and said one fluid transmitting line, another valve in said other line having movable means for controlling fluid flow therethrough from said one fluid line, said means of said one valve being connected to operate said movable means of said other valve to connect said fluid transmitting lines when said one fluid line is connected to such a source, said means of said one valve being operable to disconnect said one fluid line from such a source without causing the fluid pressure in said chamber to decrease and without causing movement of said movable means of said other valve, and said movable means of said one valve being movable from said first position to a third position to disconnect said other fluid line from said one fluid line.

6. A fluid control circuit for a movable vehicle comprising, a frame having at least one rotatable supporting wheel with a fluid operated braking mechanism, a fluid operated jack having a hollow member and a plunger member which members are movable relative to each other to form a variable size chamber, one of said members being rigidly secured to said frame with the other of said members extendible therefrom, one fluid transmitting line connected between said chamber and one control valve, said one valve having means movable from a first position to a second position to connect said one fluid line to a source of high pressure fluid and force said other member outwardly of said one member as the pressure in said chamber increases, another fluid transmitting line connected between said braking mechanism and said one fluid line, another valve in said other line having movable means for connecting and disconnecting said other fluid line to said one fluid line, said movable means of said one valve engaging said movable means of said other valve when moved from said first to said second position to connect said fluid transmitting lines to lock said one wheel against rotation, said movable means of said one valve being movable back to said first position from said second position to disconnect said one fluid line from such a source without causing the fluid pressure in said chamber to decrease and without causing movement of said movable means of said other valve whereby said one wheel remains locked, and said movable means of said one valve being movable from said first position to a third position to disconnect said one fluid line from such a source during which time it engages said movable means of said other valve to disconnect said fluid lines whereby said back wheels are released.

7. A fluid control circuit for a movable vehicle comprising, a frame having at least one rotatable supporting wheel with a fluid operated braking mechanism, a fluid operated jack having a hollow housing secured to said frame, said jack having a movable member with one portion extending outwardly from said housing and another portion forming variable size chambers within said housing, a first fluid transmitting line connected between one of said chambers and a first control valve, a second fluid transmitting line connecting the other of said chambers to said first valve, said first valve having means to connect either of said first or second lines to a source of high pressure fluid and the one of said lines not connected to the source of high pressure fluid to a low pressure fluid to force said movable member inwardly and outwardly of said housing as the pressure in said chambers varies, a third fluid transmitting line connected between said braking mechanism and said first line and having a second valve therein, said second valve having movable means for connecting and disconnecting said third fluid line to said first fluid line, said means of said first valve having a portion thereof connected to cause movement of said movable means of said second valve to connect said first and third fluid transmitting lines when said first line is connected to such a source, said means of said first valve being operable to disconnect said first line from such a source without causing the fluid pressure in said chamber to decrease and without causing movement of said movable means of said second valve, and said means of said first valve being operable to connect said first and third lines to such a low pressure fluid when said second line is connected to such a source.

8. A fluid control circuit for a movable vehicle comprising, a frame having at least one rotatable supporting wheel with a fluid operated braking mechanism, a fluid operated jack having a hollow housing secured to said frame, said jack having a movable member with one portion extending outwardly from said housing and another portion forming variable size chambers within said housing, a first fluid transmitting line connected between one of said chambers and a first control valve, a second fluid transmitting line connecting the other of said chambers to said first valve, said first valve having means movable from a first position to a second position to connect either of said first or second lines to a source of high pressure fluid and the one of said lines not connected to the source of high pressure fluid to a low pressure fluid to force said movable member inwardly and outwardly of said housing as the pressure in said chambers varies, a third fluid transmitting line connected between said braking mechanism and said first line and having another valve therein, said other valve having movable means for connecting and disconnecting said third fluid line to said first fluid line, said movable means of said first valve engaging said movable means of said other valve when moved from said first to said second position to connect said first and third fluid transmitting lines to such a source, said movable means of said first valve being movable back to said first position from said second position to disconect said first line from such a source without causing the fluid pressure in said chamber to decrease and without causing movement of said movable means of said other valve, and said movable means of said first valve being movable from said first position to a third position to disconnect said first fluid line from such a source during which time it engages said movable means of said other valve to disconnect said first and third fluid lines.

9. A mobile support having rotatable surface engaging means, a jack mechanism spaced from said surface engaging means and having an expansible chamber portion selectively connectible with a source of pressure fluid, restraining means connected to said support for restraining said surface engaging means against movement, control means having a movable element selectively operable to pressurize said chamber portion of said jack mechanism and energize said restraining means from such source of pressure fluid, said control means being further operable to disconnect said chamber portion and said restraining means from said source of pressure fluid and means for connecting said chamber portion of said jack mechanism when pressurized to maintain energization of said restraining means so that bodily movement of said support is resisted.

10. A mobile support having rotatable surface engaging means, a jack mechanism spaced from said surface engaging means and having an expansible chamber portion selectively connectible with a source of pressure fluid, restraining means connected to said support for restraining said surface engaging means against movement, control means connected to said expansible chamber, to said restraining means, and to such source of pressure fluid, said control means being operable to connect said expansible chamber and said restraining means to such source of pressure fluid for raising an end portion of said support and for energizing said restraining means respectively, and said control means being further operable to disconnect said expansible chamber and said restraining means from said source of pressure fluid while maintaining said restraining means connected to said expansible chamber when such end portion of said support is raised.

11. In a mobile vehicle having longitudinally spaced pairs of rotatable ground engaging supporting means, means for braking one pair of rotatable means to hold said vehicle immobile, jack means on said vehicle located adjacent the other pair of said rotatable means and engageable with the ground for disengaging said other pair of rotatable means from ground engagement, selectively operable control means having a plurality of control positions for connecting and disconnecting said jack means and said braking means with a source of pressure fluid, said control means being operable to admit pressure fluid to said jack means for extending said jack means into ground engagement causing said other pair of rotatable means to be disengaged from the ground, and said control means being further operable to disconnect the jack means from said source of pressure fluid and connect said braking means with said jack means for energizing said brakes when said other rotatable means are disengaged from the ground.

References Cited in the file of this patent
UNITED STATES PATENTS

| | | |
|---|---|---|
| 1,560,460 | Yates et al. | Nov. 3, 1925 |
| 1,698,612 | Todd et al. | Jan. 8, 1929 |
| 2,035,336 | Oliver | Mar. 24, 1936 |
| 2,052,547 | Clench | Sept. 1, 1936 |
| 2,175,196 | Keevil | Oct. 10, 1939 |
| 2,400,803 | Barnhart | May 21, 1946 |
| 2,409,335 | Stackelberg | Oct. 15, 1946 |
| 2,646,968 | Curtis | July 28, 1953 |
| 2,664,708 | Norelius et al. | Jan. 5, 1954 |
| 2,764,249 | Paolucci | Sept. 25, 1956 |

FOREIGN PATENTS

| | | |
|---|---|---|
| 512,170 | Canada | Apr. 26, 1955 |
| 858,638 | Germany | Dec. 8, 1952 |